United States Patent
Youn et al.

(10) Patent No.: US 8,576,777 B2
(45) Date of Patent: Nov. 5, 2013

(54) METHOD FOR TRANSMITTING SUBFRAME GROUPING INFORMATION AND DECODING SUBFRAME GROUPED FRAMES

(75) Inventors: Ae Ran Youn, Gyeonggi-do (KR); Jeong Ki Kim, Gyeonggi-do (KR); Ki Seon Ryu, Gyeonggi-do (KR); Young Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 12/921,761

(22) PCT Filed: Mar. 9, 2009

(86) PCT No.: PCT/KR2009/001159
§ 371 (c)(1),
(2), (4) Date: Sep. 9, 2010

(87) PCT Pub. No.: WO2009/113783
PCT Pub. Date: Sep. 17, 2009

(65) Prior Publication Data
US 2011/0002273 A1    Jan. 6, 2011

Related U.S. Application Data

(60) Provisional application No. 61/035,051, filed on Mar. 10, 2008.

(30) Foreign Application Priority Data

Apr. 3, 2008    (KR) .................... 10-2008-0031205

(51) Int. Cl.
*H04W 4/00*    (2009.01)

(52) U.S. Cl.
USPC .......................................... 370/328

(58) Field of Classification Search
USPC ............. 370/328, 329, 330, 310.2, 315, 320, 370/331, 332, 338
See application file for complete search history.

(56) References Cited

U.S. PATENT DOCUMENTS

| | | | |
|---|---|---|---|
| 7,245,628 B2 * | 7/2007 | Shi et al. | 370/437 |
| 7,593,731 B2 * | 9/2009 | Lim et al. | 455/436 |
| 7,593,732 B2 * | 9/2009 | Kim et al. | 455/436 |
| 7,653,393 B2 * | 1/2010 | Kim et al. | 455/437 |
| 8,005,420 B2 * | 8/2011 | Murali et al. | 455/3.06 |
| 8,155,064 B2 * | 4/2012 | Harada et al. | 370/329 |
| 2005/0192011 A1 * | 9/2005 | Hong et al. | 455/440 |
| 2006/0262744 A1 | 11/2006 | Xu et al. | |
| 2007/0064669 A1 * | 3/2007 | Classon et al. | 370/347 |

(Continued)

FOREIGN PATENT DOCUMENTS

| | | |
|---|---|---|
| JP | 2007-181126 | 7/2007 |
| WO | 2005-004500 | 1/2005 |
| WO | 2005-119989 | 12/2005 |

*Primary Examiner* — Anh Ngoc Nguyen
(74) *Attorney, Agent, or Firm* — Lee, Hong, Degerman, Kang & Waimey

(57) ABSTRACT

A method for transmitting subframe grouping information is provided. The method includes updating a grouping information field of a media access control (MAC) message, which a serving base station periodically broadcasts to a mobile station (MS), using subframe grouping information determined by a target base station, and periodically transmitting the MAC message to the MS. The method provides downlink signaling for supporting variable Transmission Time Intervals (TTIs) of a base station when handover is performed, thereby minimizing service delay of each mobile station and enabling efficient utilization of resources.

15 Claims, 9 Drawing Sheets

(56) References Cited

U.S. PATENT DOCUMENTS

2007/0230510 A1* 10/2007 You et al. ................. 370/503
2007/0258407 A1* 11/2007 Li et al. ................... 370/331
2009/0041024 A1* 2/2009 Steudle et al. ........... 370/395.3

* cited by examiner

METHOD FOR TRANSMITTING SUBFRAME GROUPING INFORMATION AND DECODING SUBFRAME GROUPED FRAMES

This application is a the National Stage filing under 35 U.S.C. 371 of International Application No. PCT/KR2009/001159, filed on Mar. 9, 2009, which claims the benefit of earlier filing date and right of priority to Korean Application No. 10-2008-0031205, filed on Apr. 3, 2008, and also claims the benefit of U.S. Provisional Application Ser. No. 61/035,051, filed on Mar. 10, 2008, the contents of which are all incorporated by reference herein in their entireties.

TECHNICAL FIELD

The present invention relates to variable TTIs, and more particularly, to a downlink signaling method for supporting variable TTIs of a base station when handover of a Mobile Station (MS) is performed in a mobile communication system and a method for decoding frames at an MS.

BACKGROUND ART

A frame is a data sequence channel having a predetermined period of time in terms of physical characteristics and includes a downlink (DL) subframe and an uplink (UL) subframe. A preamble is specific sequence data located at a first symbol of each frame and is used for synchronization of a terminal or Mobile Station (MS) to a Base Station (BS) or used for channel estimation. A Frame Control Header (FCH) provides DL-MAP-related channel allocation information and channel code information. The DL-MAP/UL-MAP is a Media Access Control (MAC) message used to notify an MS of channel resource allocation in uplink/downlink. A Downlink Channel Descriptor (DCD)/Uplink Channel Descriptor (UCD) message is a MAC message used for notification of physical characteristics in a downlink/uplink channel. A data burst is a unit of data transmitted to or received by an MS. Notification of the size and position of each burst is provided through a DL/UL-MAP message.

FIG. 1 illustrates an example frame structure used in a broadband wireless access system of IEEE 802.16e.

One frame in the broadband wireless access system, for example a 5 ms frame in WiMAX, is divided into one DL subframe and one UL subframe. The DL frame includes a preamble, an FCH, a DL-MAP, a UL-MAP, and DL bursts and the UL frame includes UL control channels such as an HARQ ACK channel, a fast-feedback channel, and a ranging channel and UL bursts.

A new broadband wireless access system such as IEEE 802.16m/IMT-Advanced is under development to improve the broadband wireless access system of IEEE 802.16e. IEEE 802.16m introduces superframe and subframe structures, unlike the conventional frame structure.

FIG. 2 illustrates example superframe, frame, and subframe structures in IEEE 802.16m.

In the example of FIG. 2, one superframe is 20 ms long and includes 4 frames, each 5 ms long. A superframe MAP, which is a message including system information and broadcast messages, is provided at the beginning of each superframe. The superframe MAP may have a structure including several symbols or a structure including several subframes. One 5 ms-long frame includes 8 subframes and one subframe includes 6 OFDMA symbols.

FIG. 3 illustrates a subframe structure in which the ratio of the number of DL subframes to the number of UL subframes is set to 5:3 in a TDD system.

One frame structure including 8 subframes may include 5 DL subframes and 3 UL subframes.

FIG. 4 illustrates DL and UL-related control channels in the subframe structure of FIG. 3.

In the example of FIG. 4, a preamble is located at the beginning of each frame and a DL sub-MAP is located at each DL subframe. The DL sub-MAP is located subsequent to the preamble in the first DL subframe SF#0 and is located at the beginning of each of the remaining subframes SF#1-4. The DL sub-MAP mainly includes resource allocation information in the subframe including the DL sub-MAP and additionally includes subframe configuration information or DL system information. A UL sub-MAP may be located subsequent to the DL sub-MAP.

In FIG. 4, the UL sub-MAP is located subsequent to the DL sub-MAP in each of the second, third, and fourth subframes SF#1, SF#2, and SF#3.

The UL sub-MAPs of the second DL subframe SF#1, the third DL subframe SF#2, and the fourth DL subframe SF#3 include resource allocation information corresponding to the sixth DL subframe SF#5, the seventh DL subframe SF#6, and the eighth DL subframe SF#7, respectively. Each of the UL subframes SF#5, SF#6, and SF#7 may include UL control channels associated with the UL subframe such as an HARQ ACK/NACK channel, a fast feedback channel, and a ranging channel.

Two or more DL subframes or two or more UL subframes may be grouped according to scheduling of the BS.

FIG. 5 schematically illustrates a handover procedure when an MS has issued a handover request to a BS.

A serving BS broadcasts information including network structure information to all MSs in a cell through a neighbor advertisement (MOB_NBR-ADV) MAC message to notify all the MSs of information of neighbor BSs.

A Mobile Station (MS) scans neighbor BSs for handover and performs handover based on channel quality information of channels established with neighbor BSs obtained through scanning.

Handover can be initiated by both the BS and the MS. In the case where the MS requests handover, the MS transmits a handover request (MOB-MSHO-REQ) MAC message to the BS (510). The handover request (MOB-MSHO-REQ) MAC message includes channel status information of signals received from neighbor BSs.

The serving BS receives an ACK signal required to perform handover to a target BS from each neighbor BS before the serving BS transmits a handover response (MOB-BSHO-RSP) MAC message to allow the serving BS or the MS to perform handover.

The serving BS then transmits a handover response (MOB-BSHO-RSP) MAC message to the MS (540).

The MS transmits information of a target BS to which handover is to be performed to the serving BS through a handover indicator (MOB_HO-IND) (550).

The serving BS transmits information indicating handover of the MS to the target BS (560) and terminates an ARQ connection allocated to the MS and all connections associated with data transmission.

In order to perform fast handover of the MS, the target BS can transmit a fast ranging Information Element (IE), which uses a handover identifier (HO ID) or a MAC address of the MS, to the MS (570), thereby omitting a CDMA code ranging procedure. In general, when the MS needs to perform handover, the MS transmits a handover CDMA ranging code to the target BS. When successful ranging is possible, the target BS broadcasts a ranging response (RNG-RSP) MAC message and transmits a CDMA allocation IE to cause the MS to transmit a ranging request (RNG-REQ) MAC message.

Upon receiving the fast ranging IE or the CDMA allocation IE, the MS transmits a ranging request (RNG-REQ) MAC message to the target BS (590). The ranging request (RNG-REQ) MAC message includes a handover identifier (HO ID) or MAC address of the MS, CMAC information for authentication of the MS, etc.

Upon receiving the ranging request (RNG-REQ) MAC message, the BS generates a Connection ID (CID) of the MS and transmits a ranging request (RNG-RSP) MAC message to the MS. Here, the BS can notify the MS of whether or not to omit renegotiation and re-authentication/re-registration processes of the MS through a handover process optimization field in the ranging request (RNG-RSP) MAC message. Upon receiving the ranging request (RNG-RSP) MAC message, the MS can omit some processes through the handover process optimization.

In FIG. 6, the TTIs of first, second, and third subframes are each one subframe (i.e., TTI=1 subframe) and fourth and fifth subframes are grouped to construct one TTI (i.e., TTI=2 subframes). Since information indicating whether or not each subframe has been grouped or TTI information is transmitted in a superframe MAP, an MS decodes, when attempting to perform handover, received signals according to a default TTI (for example, TTI=1 subframe) during up to 15 ms until a superframe MAP is received from a target BS. This increases interruption time for handover.

Particularly, in the case where an MS, which is attempting to perform handover, receives a signal from the target BS, beginning with a second frame, as shown in FIG. 7, the MS will attempt to decode the signal according to a 1-subframe TTI format, thus failing to decode a data burst allocated to the frame.

DISCLOSURE OF THE INVENTION

Technical Problem

Accordingly, the present invention is directed to a method for transmitting subframe grouping information and a method for decoding subframe-grouped frames that substantially obviate one or more problems due to limitations and disadvantages of the related art.

A first object of the present invention is to provide a method for transmitting subframe grouping information from a Base Station (BS), which facilitates decoding of subframe-grouped frames when handover of a Mobile Station (MS) is performed and also minimizes interruption time.

A second object of the present invention is to provide a method for decoding subframe-grouped frames at an MS when handover is performed from a serving BS to a target BS when the above subframe grouping information transmission method is applied to the serving BS.

Technical Solution

In accordance with one embodiment of the present invention to achieve the first object, a method for transmitting subframe grouping information of a target base station to a mobile station for variable TTIs includes updating a grouping information field of a MAC message, which a serving base station periodically broadcasts to the mobile station, using subframe grouping information determined by the target base station, and periodically transmitting the MAC message to the mobile station.

The MAC message may be a neighbor advertisement (MOB_NBR-ADV) message including information of a neighbor base station.

The subframe grouping information may be information indicating whether or not subframes of each of a plurality of frames included in a superframe have been grouped and indicating a grouping format of the subframes of each of the plurality of frames.

The grouping information field may include at least one of subframe bitmap start information and a subframe bitmap.

The grouping information field may include at least one of a frame group indication sequentially, in a frame order, indicating whether or not subframes of each frame have been grouped, a frame format indication indicating whether or not subframe grouping formats of the frames included in the superframe are identical, and a number of subframe-grouped frames in the superframe.

The target base station may be a base station that has a signal quality level higher than a threshold or has a highest signal quality level among base stations adjacent to the serving base station.

In accordance with another embodiment of the invention to achieve the first object, a method for transmitting subframe grouping information of a target base station to a mobile station for variable TTIs includes updating a grouping information field of a handover response message using subframe grouping information determined by the target base station, and transmitting the handover response message to the mobile station when it has been decided to perform handover of the mobile station.

The step of updating the grouping information field may include adding, when a handover request is received from the mobile station, the subframe grouping information to the grouping information field.

The step of updating the grouping information field may include deciding, when a measurement report message is received from the mobile station, whether or not to perform handover of the mobile station according to measurement results from the mobile station included in the measurement report message, and adding, when it has been decided to perform handover of the mobile station, the subframe grouping information to the grouping information field.

The subframe grouping information may be information indicating whether or not subframes of each of a plurality of frames included in a superframe have been grouped and indicating a grouping format of the subframes of each of the plurality of frames.

The grouping information field may include at least one of subframe bitmap start information and a subframe bitmap.

The grouping information field may include at least one of a frame group indication sequentially, in a frame order, indicating whether or not subframes of each frame have been grouped, a frame format indication indicating whether or not subframe grouping formats of the frames included in the superframe are identical, and a number of subframe-grouped frames in the superframe.

The target base station may be a base station that has a signal quality level higher than a threshold or has a highest signal quality level among base stations adjacent to the serving base station.

In accordance with one embodiment of the present invention to achieve the second object, a method for a mobile station to decode subframe-grouped frames included in a superframe having variable TTIs received from a target base station includes the mobile station receiving subframe grouping information included in a grouping information field of a MAC message that is periodically broadcast from a serving base station, and decoding a superframe from a target base station according to bitmap start information and a subframe bitmap included in the subframe grouping information while performing handover to the target base station.

In accordance with another embodiment of the present invention to achieve the second object, a method for a mobile station to decode subframe-grouped frames included in a superframe having variable TTIs received from a target base station includes the mobile station transmitting a handover request message to a serving base station, storing, when a handover response message is received from the serving base station, subframe grouping information included in a grouping information field of the handover response message, and decoding a superframe from a target base station according to bitmap start information and a subframe bitmap included in the subframe grouping information while performing handover to the target base station.

Advantageous Effects

The embodiments of the present invention provide a downlink signaling method for supporting variable TTIs of a base station when handover is performed, thereby minimizing service delay of each mobile station and enabling efficient utilization of resources.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts. The embodiments of the present invention described below can be modified to various other forms and the scope of the present invention is not limited to the embodiments.

The embodiments of the present invention provide a method in which a Mobile Station (MS) receives subframe grouping information of a target Base Station (BS) required for handover of the MS before handover of the MS is performed, thereby minimizing handover delay due to various TTIs.

The MS can receive subframe grouping information of the target BS in a MAC message format periodically or upon the occurrence of an event such as an attempt to perform handover.

First, in the case where the MS periodically receives subframe grouping information, the serving BS can transmit the subframe grouping information through inclusion in information of neighbor BSs that the serving BS periodically broadcasts.

Figure 8:
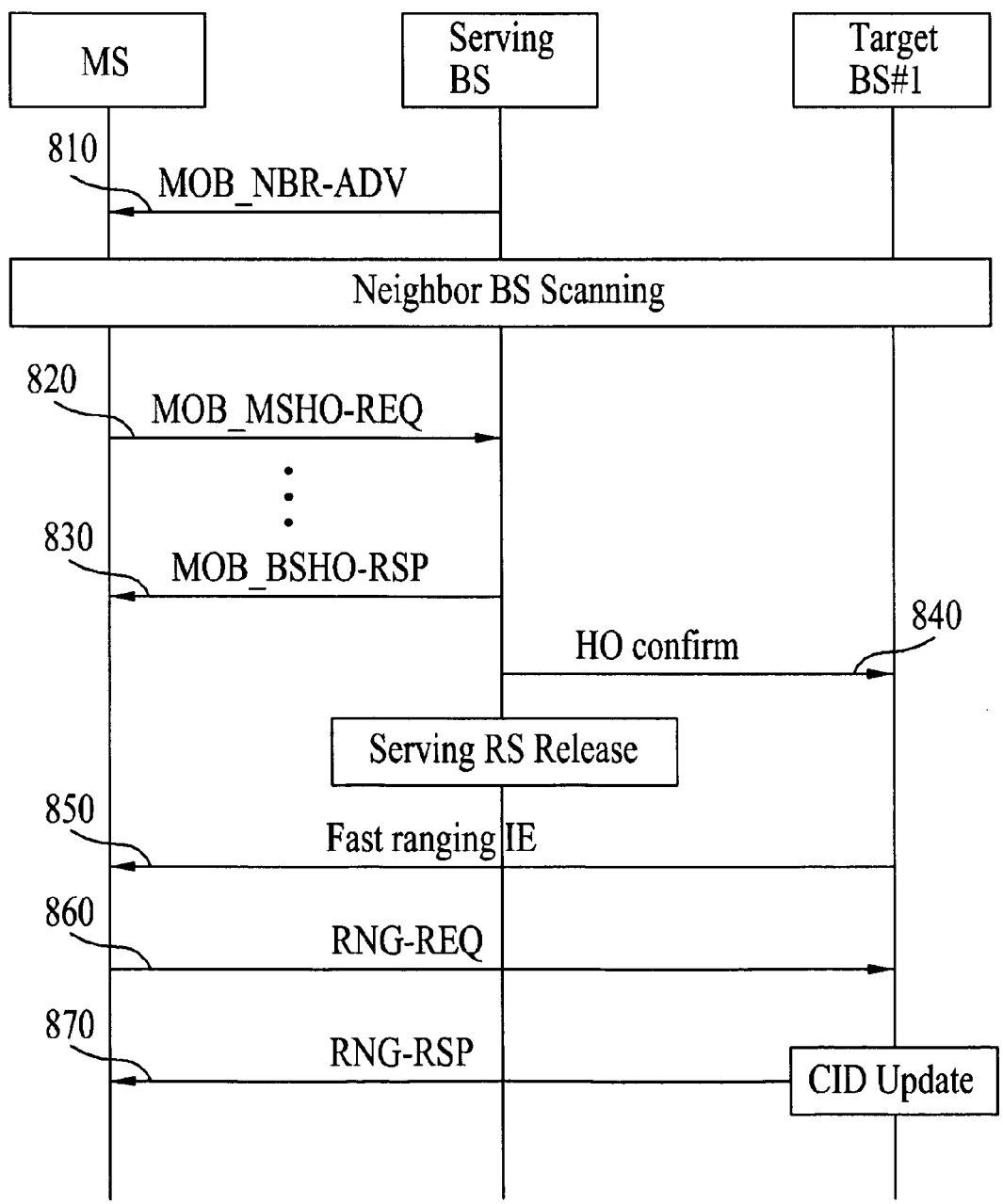
FIG. 8 is an example process flow diagram of a method for transmitting subframe grouping information according to an embodiment of the present invention.

FIG. 8 is an example process flow diagram of a method for transmitting subframe grouping information according to an embodiment of the present invention.

A serving BS incorporates subframe grouping information into a grouping information field in a neighbor advertisement (MOB_NBR-ADV) message including information of neighbor BSs and transmits the neighbor advertisement message to an MS (810). The serving BS can update subframe grouping information each time it transmits the neighbor advertisement (MOB_NBR-ADV) message.

The subsequent processes are identical to general handover processes. That is, when the MS requests handover (820), the serving BS transmits a handover response message to the MS (830) and transmits a handover confirmation (HO Confirm) message to a target BS (840). Thereafter, the serving BS is released from the MS. Preferably, a BS, which has a signal quality level higher than a threshold or has a highest signal quality level among BSs adjacent to the serving BS, is determined to be the target BS.

The target BS transmits a fast ranging IE to the MS (850). When the MS issues a ranging request (860), the target BS generates and updates a connection ID and transmits a ranging response message to the MS (870).

The MS decodes a superframe from the target BS in the above or subsequent procedure. Here, the MS uses subframe grouping information received through the neighbor advertisement (MOB_NBR-ADV) message to decode the superframe.

Table 1 illustrates an example neighbor advertisement (MOB_NBR-ADV) message including such subframe grouping information.

TABLE 1

| Syntax | Size | Notes |
|---|---|---|
| MOB_NBR-ADV_Message format( ) { | — | — |
| Management Message Type = 53 | 8 bits | — |
| Skip-optional-fields bitmap | 8 bits | 0b000: HO/BandHO request Bit [0]: if set to 1, omit Operator ID field. Bit [1]: if set to 1, omit NBR BS ID field. Bit [2]: if set to 1, omit HO |

TABLE 1-continued

| Syntax | Size | Notes |
|---|---|---|
| | | process optimization field.<br>Bit [3]: if set to 1, omit QoS related fields.<br>Bit[4]: if set to 1, omit Sub-frame group fields<br>Bit[5]-[7]; reserved |
| If (Skip-optional-fields-[0] = 0) { | — | — |
|   Operator ID | 24 bits | Identifier of the network provider |
| } | — | — |
| Configuration Change Count | 8 bits | Incremented each time the information for the associated neighbor BS has changed. |
| Fragmentation Index | 4 bits | Indicates the current fragmentation index. |
| Total Fragmentation | 4 bits | Indicates the total number of fragmentations. |
| N_NEIGHBORS | 8 bits | — |
| For (j = 0 ; j < N_NEIGHBORS; j++) { | — | — |
|   Length | 8 bits | Length of message information including all fields within the FOR loop. |
|   PHY Profile ID | 8 bits | Aggregated identifiers of co-located FA indicator, FA configuration indicator, FFT size, bandwidth, operation mode of the starting subchannelization of a frame, and channel number. |
|   if (FA Index Indicator == 1) {<br>  FA Index | 8 bits | Frequency assignment index. This field is present only if the FA index indicator in PHY profile ID is set. Otherwise, the neighbor BS has the same FA Index or the center frequency is indicated using the TLV-encoded information. |
|   } | — | — |
|   if (BS EIRP Indicator == 1) {<br>  BS EIRP | 8 bits | Signed Integer from −128 to 127 in unit of dBm This field is present only if the BS EIRP indicator is set in PHY Profile ID. Otherwise, the BS has the same EIRP as the serving BS. |
|   } | — | — |
|   if (Skip-optional-fields[1] = 0) {<br>  Neighbor BSID | 24 bits | This is an optional field for OFDMA PHY, and it is omitted or skipped if Skip Optional Fields flag = 1. |
|   } | — | — |
|   Preamble Index/Subchannel Index | 8 bits | For the OFDMA PHY this parameter defines the PHY specific preamble. For the OFDM PHY, the 5 LSB contain the active DL subchannel index and the 3 MSB shall be Reserved and set to '0b000' For OFDMA PHY, bit 7 is used to indicate the reuse factor of the neighbor for purpose of CINR measurement for handoff. A value of '0' indicates a |

TABLE 1-continued

| Syntax | Size | Notes |
|---|---|---|
| | | reuse factor of 1 and a value of '1' indicates reuse factor of 3. |
| if (Skip-optional-fields[2] = 0) { | — | — |
| HO Process Optimization | 8 bits | HO Process Optimization is provided as part of this message is indicative only. HO process requirements may change at time of actual HO. For each Bit location, a value of '0' indicates the associated reentry management messages shall be required, a value of '1' indicates the reentry management message may be omitted. Regardless of the HO Process Optimization TLV settings, the target BS may send unsolicited SBC-RSP and/or REG-RSP management messages<br>Bit #0: Omit SBC-REQ/RSP management messages during re-entry processing<br>Bit #1: Omit PKM Authentication phase except TEK phase during current re-entry processing<br>Bit #2: Omit PKM TEK creation phase during reentry processing<br>Bit #3: Omit Network Address Acquisition manage-ment messages during current reentry processing<br>Bit #4: Omit Time of Day Acquisition management messages during current reentry processing<br>Bit #5: Omit TFTP management messages during cur-rent re-entry processing<br>Bit #6: Full service and operational state transfer or sharing between serving BS and target BS (All static and dynamic context, e.g., ARQ window contents, timers, counters, state machines)<br>Bit #7: Omit REG-REQ/RSP management during cur-rent re-entry processing. |
| } | — | — |
| if (Skip-optional-fields-[3] = 0) { | — | — |
| Scheduling Service Supported | 8 bits | Bitmap to indicate if BS supports a particular scheduling service. 1 indicates support, 0 indicates not support:<br>Bit #0: Unsolicited grant service (UGS)<br>Bit #1: Real-time polling service (rtPS)<br>Bit #2: Non-real-time polling service (nrtPS)<br>Bit #3: Best effort (BE) service<br>Bit #4: Extended real-time polling service (ertPS) If the value of |

TABLE 1-continued

| Syntax | Size | Notes |
|---|---|---|
| | | bit 0 through bit 4 is 0b00000, it indicates no information on service available. Bits #5-7: Reserved; shall be set to zero |
| } | — | — |
| if (Skip-optional-fields-[4] = 0) { | — | — |
| Frame group indication | 4 bits | |
|   Frame format indication | 1 bit | |
|   if(Frame group indication = 1111 & Frame format indication = 1){ | | Same frame format |
|     Start of Sub-frame bitmap | 8 bits | |
|     Sub-frame bitmap | 8 bits | |
|   } | | |
|   Else if(Frame format indication = 0){ | | Different frame format |
|   Number of (bit=1) in Frame group indication | 2 bits | |
|   for(j=0; j<number of Frame group indication; j++){ | | |
|     Start of Sub-frame bitmap | 8 bits | |
|     Sub-frame bitmap | 8 bits | |
|   } | | |
| } | | |
| } | | |
| DCD Configuration Change Count | 4 bits | This represents the 4 LSBs of the neighbor BS current DCD configuration change count. |
| UCD Configuration Change Count | 4 bits | This represents the 4 LSBs of the neighbor BS current UCD configuration change count. |
| TLV Encoded Neighbor information | variable | TLV-specific |
| } | — | — |
| } | — | — |

As shown in Table 1, only when Skip-optional-fields-[4]=0, does the BS add subframe grouping information to a corresponding field (i.e., a grouping information field). When Skip-optional-fields-[4]=1, the BS can omit the grouping information field. Even when subframe grouping information is included in the grouping information field, the MS may be configured to skip the corresponding information if Skip-optional-fields-[4]=1.

The frame group indication included in the subframe grouping information indicates whether or not subframes of the four frames included in the superframe have been grouped using 4 bits. For example, when subframes of a second frame and subframes of a third frame have been grouped, the frame group indication is represented by '0110'.

Figure 1:
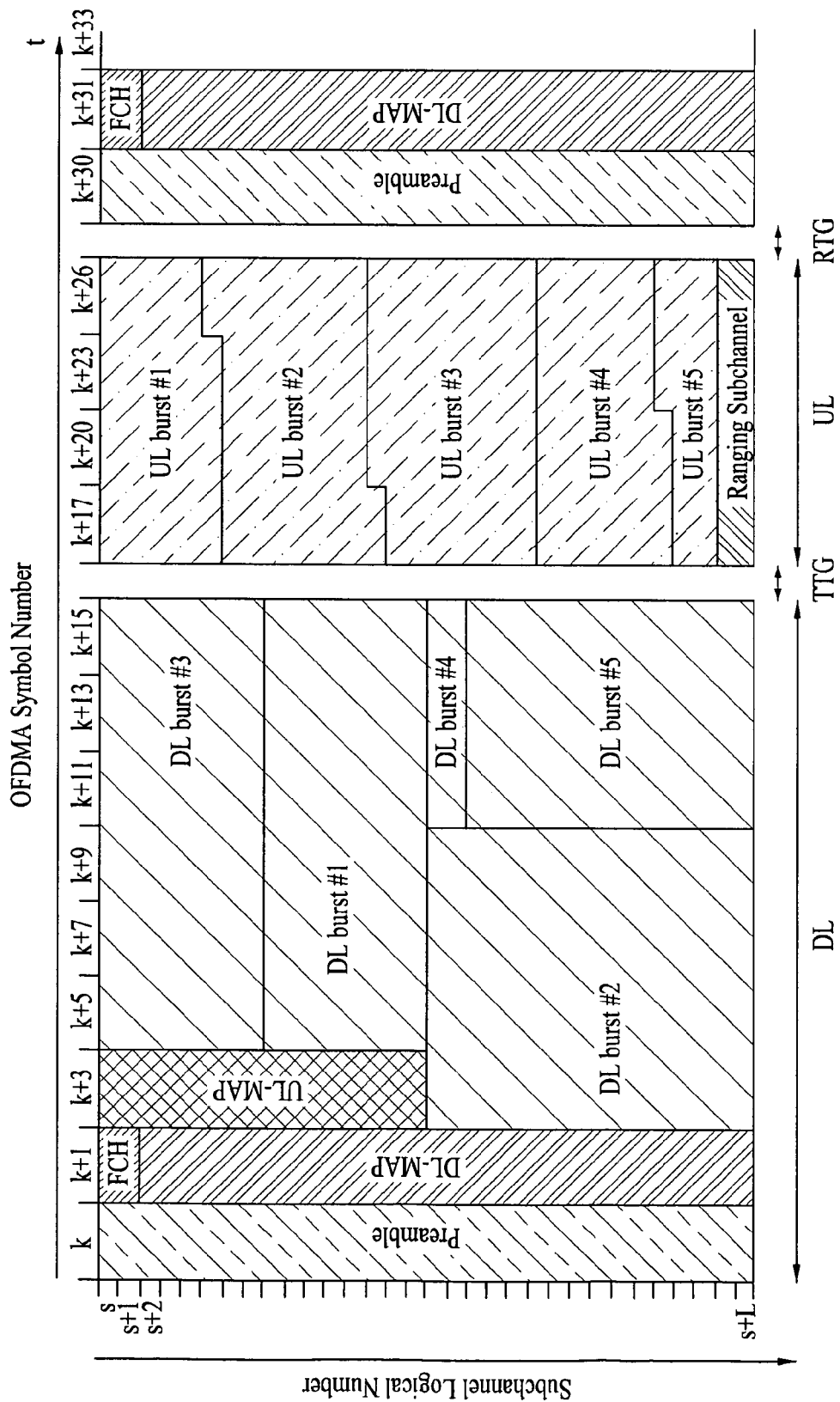
FIG. 1 illustrates a frame structure of IEEE 802.16.
Figure 2:
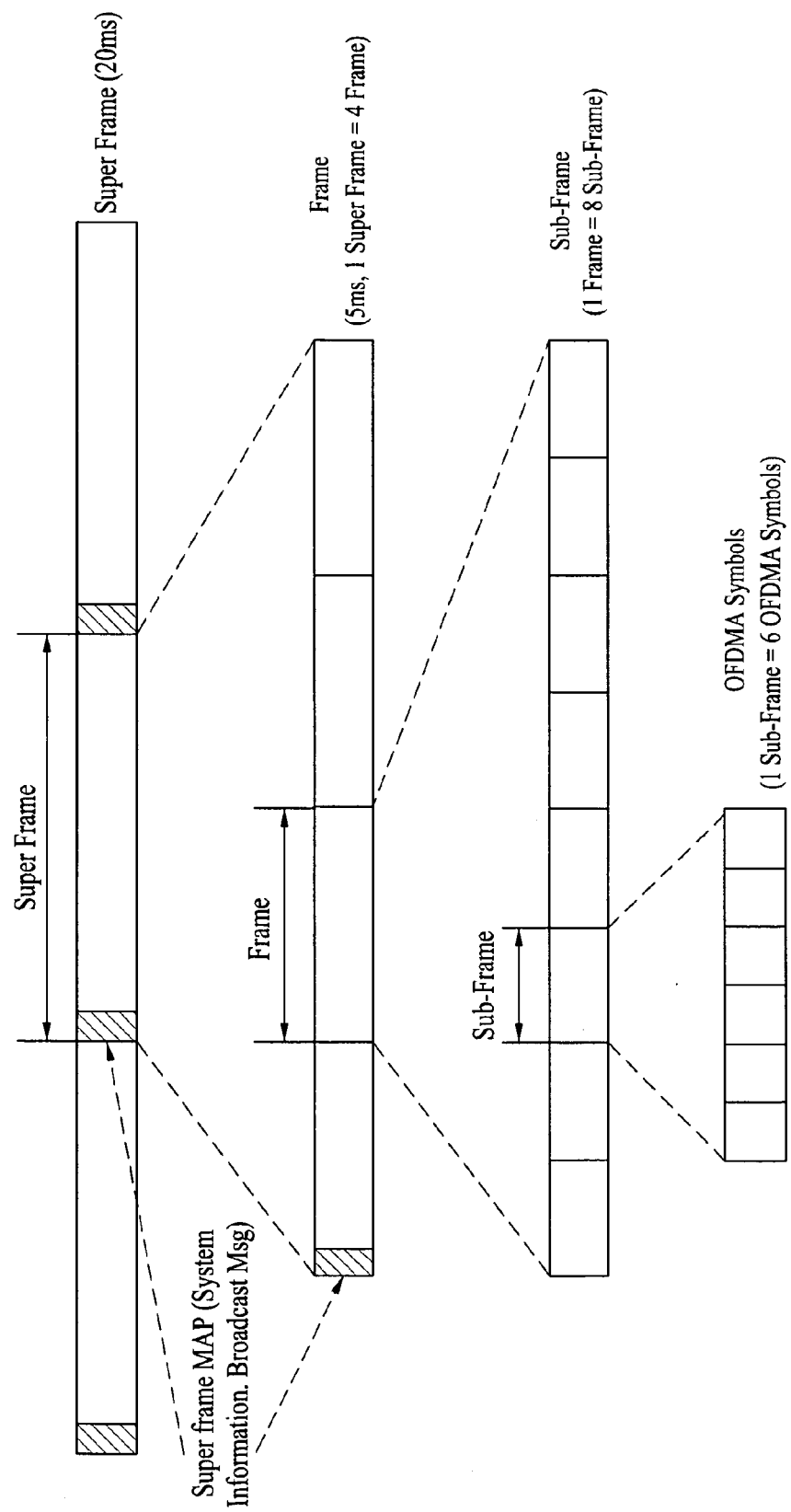
FIG. 2 illustrates example superframe, frame, and subframe structures in IEEE 802.16m.
Figure 3:
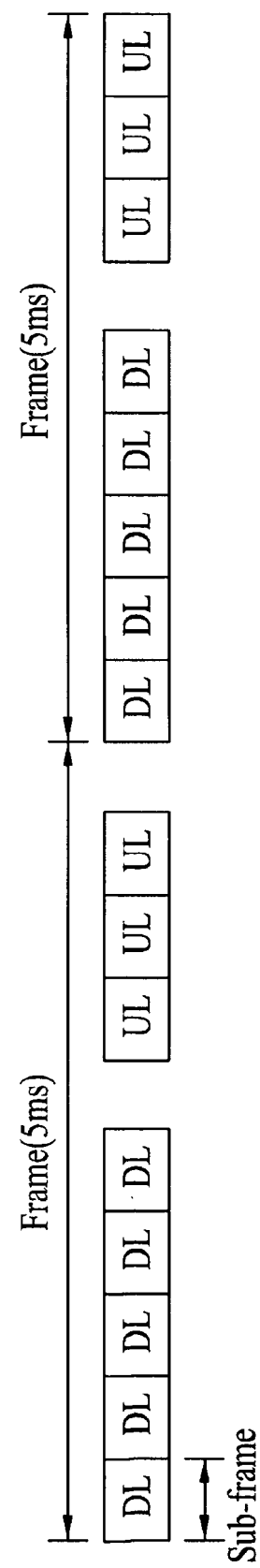
FIG. 3 illustrates an example frame structure in a TDD system.
Figure 4:
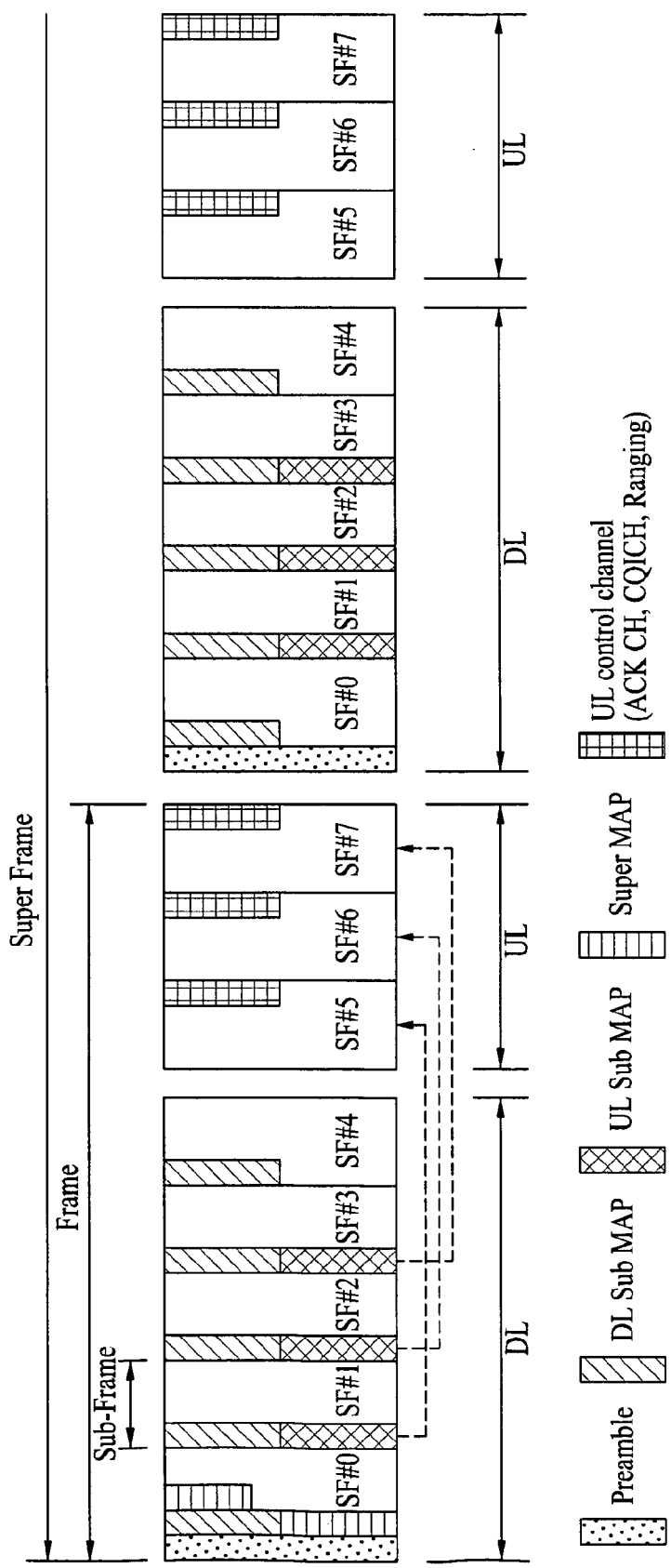
FIG. 4 illustrates an example wherein DL and UL-related control channels are included in the subframe structure of FIG. 3.
Figure 5:
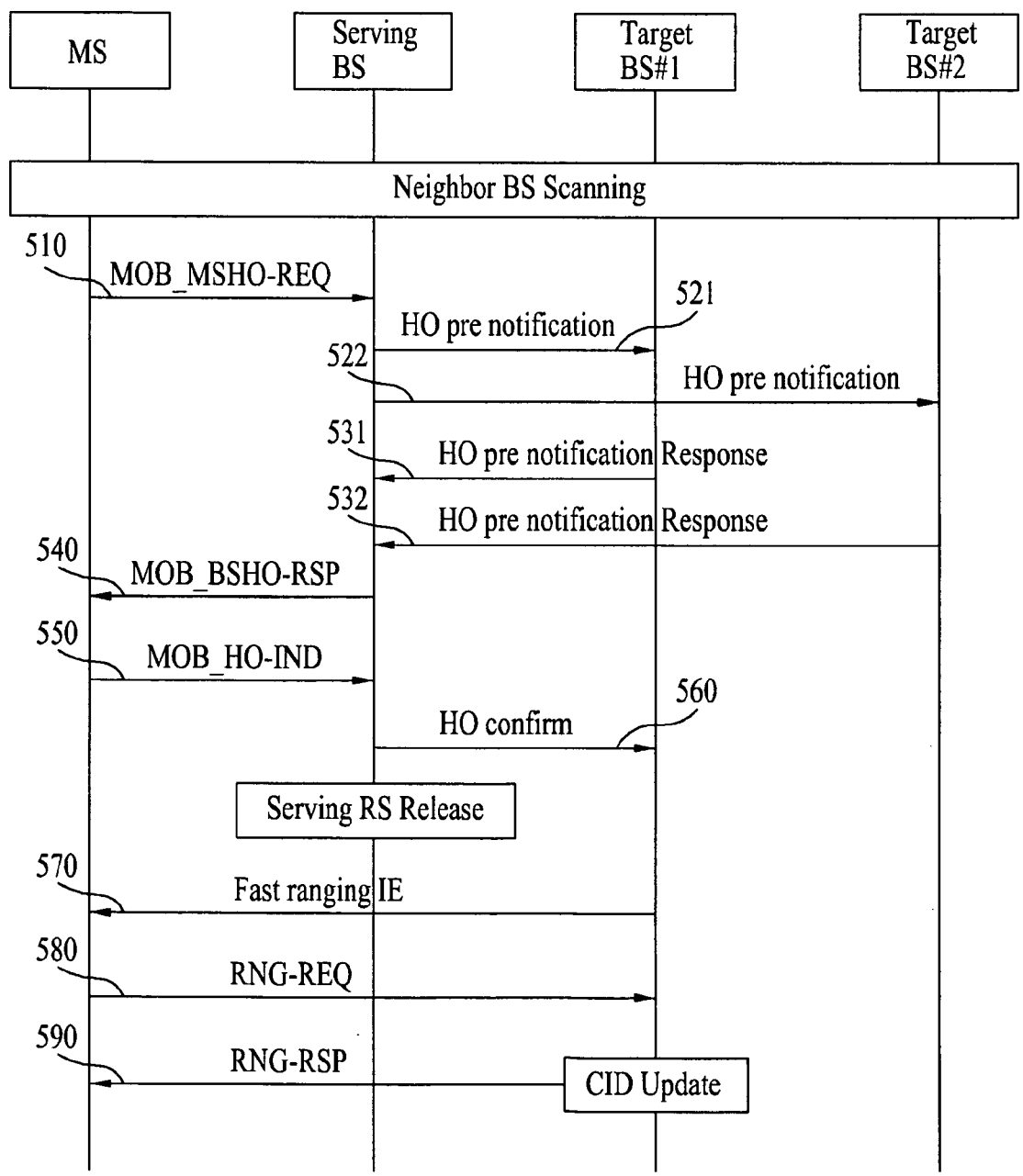
FIG. 5 is a schematic process flow diagram illustrating a handover procedure in a broadband wireless access system.
Figure 6:
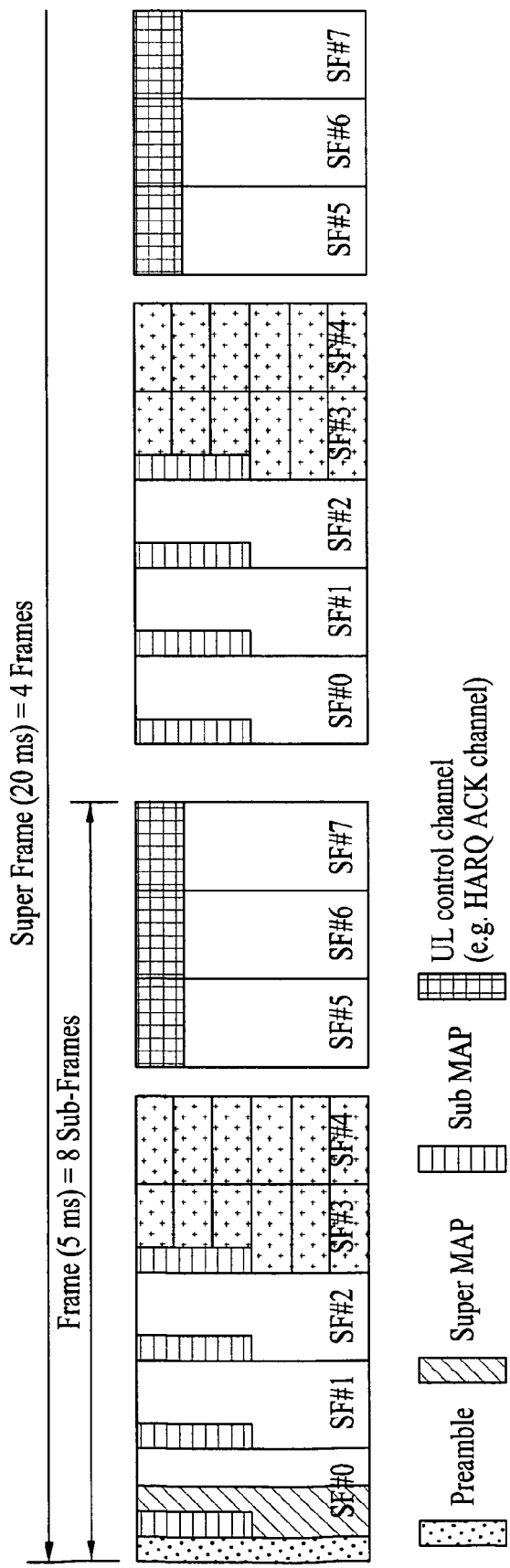
FIG. 6 illustrates an example of resource allocation when various TTIs are provided in the IEEE 802.16m system.
Figure 7:
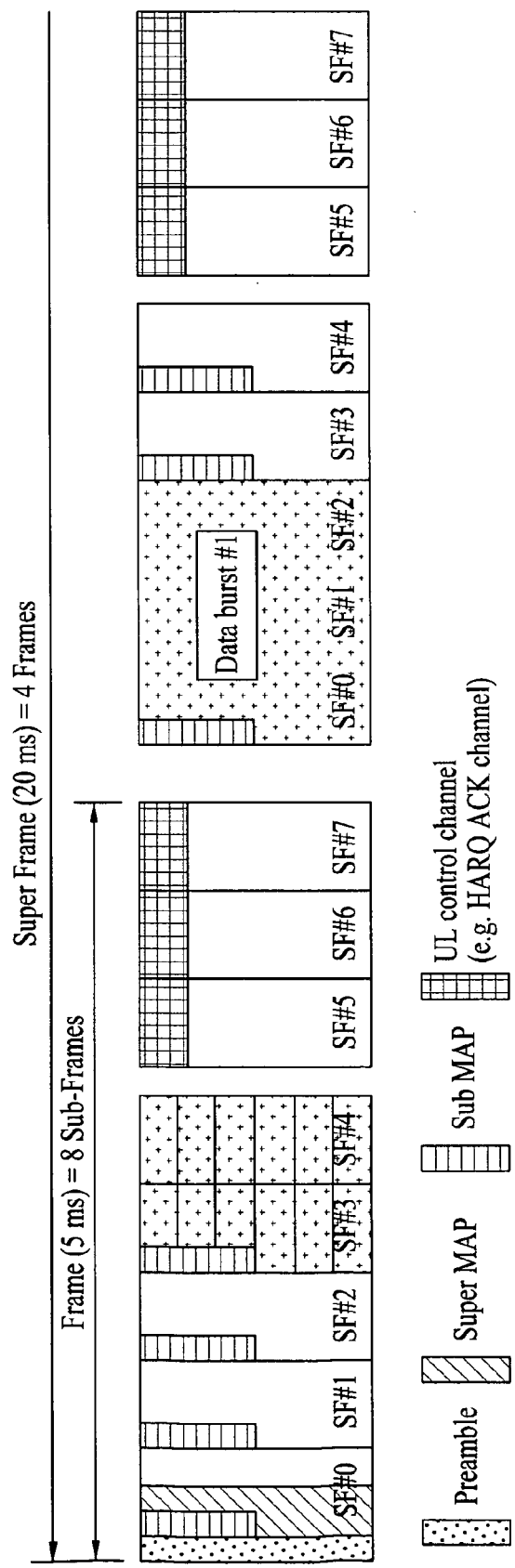
FIG. 7 illustrates another example of resource allocation when various TTIs are provided in the IEEE 802.16m system.

The frame format indication indicates whether or not the subframe grouping formats of the four frames of the superframe are identical. The frame format indication is represented by '1' when the subframe grouping formats of the four frames are identical. In the example of FIG. 7, the frame format indication is represented by '0' since the grouping formats of the first and second frames are different.

The "Number of (bit=1) in Frame group indication" information indicates the number of subframe-grouped frames in one superframe (i.e., during 20 ms). In the example of FIG. 7, this information is represented by '10' which indicates that the number of subframe-grouped frames is 2.

The subframe bitmap start information (start of subframe bitmap) indicates subframe grouping information. This information indicates the first of the grouped subframes by '1'. In the case of the second frame in FIG. 7, the subframe bitmap start information is represented by '1000000'.

The subframe bitmap indicates each grouped subframe by '1'. In FIG. 7, the subframe bitmap of the second frame is '11100000'. The MS can determine grouped subframe information through the subframe bitmap start information and the subframe bitmap. That is, if subframes #0-#2 of the second frame have been grouped, the MS can determine that TTI=3 subframes. When the subframe grouping formats of frames of a superframe are different, the MS can determine the TTI of each frame whose frame group indication is set to '1', i.e., the TTI of each frame including grouped subframes.

When the MS requests handover or when the serving BS attempts to perform handover of the MS, subframe grouping information may be included in a handover response (MOB-BSHO-RSP) message that is transmitted from the serving BS to the MS. This event triggered method can reduce overhead, compared to the periodic transmission method described above.

Figure 9:
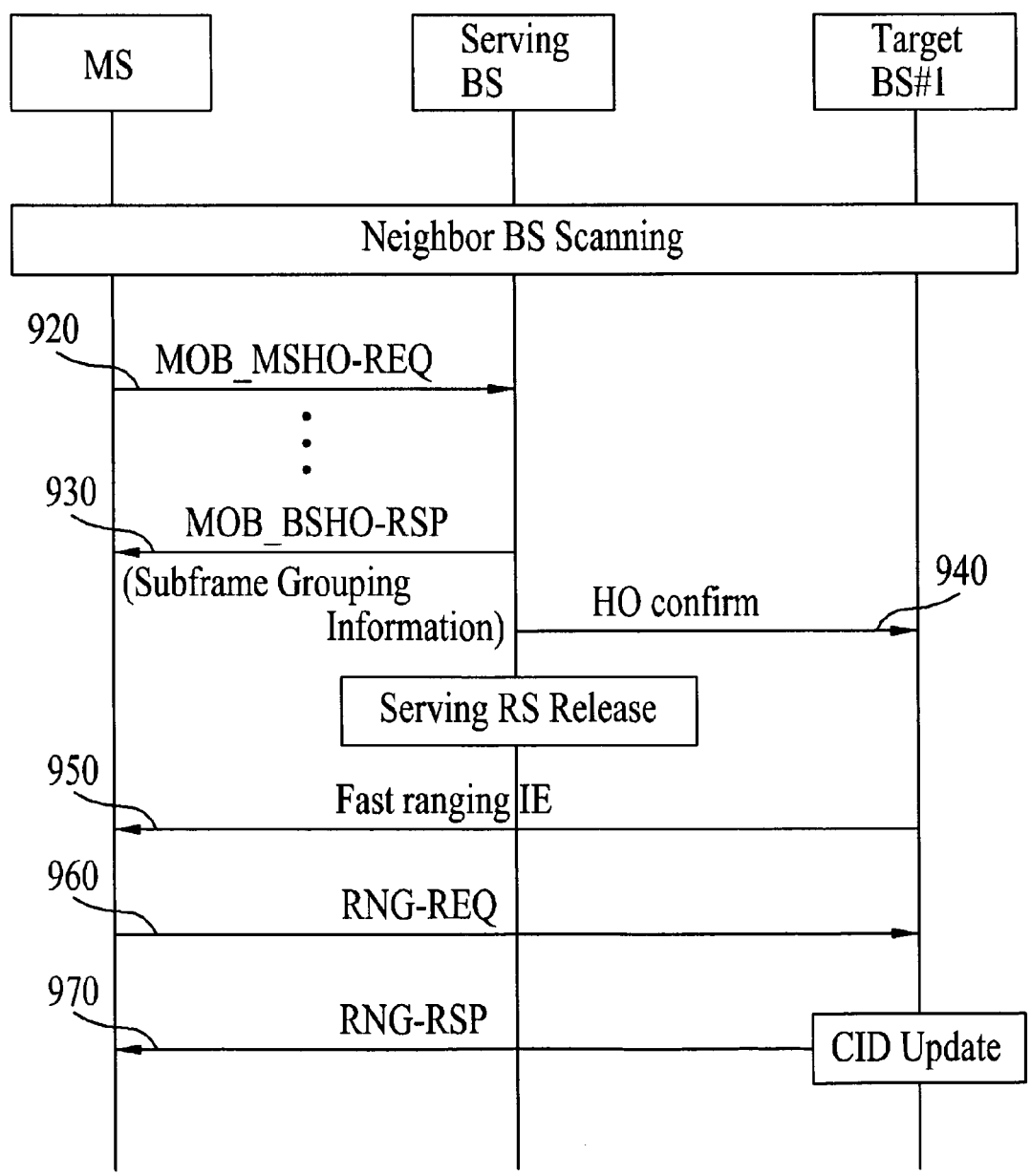
FIG. 9 is an example process flow diagram of a subframe grouping information transmission method according to another embodiment of the present invention.

FIG. 9 is an example process flow diagram of a subframe grouping information transmission method according to another embodiment of the present invention.

An MS scans neighbor BSs based on a neighbor advertisement (MOB_NBR-ADV) message from a serving BS.

When it is determined that the signal quality of the serving BS is less than a reference level for determining handover of the MS or is less than the signal quality of a neighbor BS while the MS scans neighbor BSs, the MS transmits a handover request message to the serving BS (920).

The serving BS transmits a handover response message including subframe grouping information of a superframe of the target BS to the MS (930).

In this procedure, the serving BS may decide to perform handover of the MS and add subframe grouping information to the grouping information field, given only that the MS has transmitted a handover request.

Alternatively, when the serving BS has received a measurement report message including scanning results from the MS, the serving BS can determine whether or not to perform handover of the MS according to measurement results of the MS included in the measurement report message. When the serving BS has decided to perform handover of the MS, the serving BS can add subframe grouping information to the grouping information field.

In addition, the serving BS transmits a handover confirmation (HO Confirm) message to the target BS (940). Thereafter, the serving BS is released from the MS. Preferably, a BS, which has a signal quality level higher than a threshold or has a highest signal quality level among BSs adjacent to the serving BS, is determined to be the target BS.

The target BS transmits a fast ranging IE to the MS (950). When the MS transmits a ranging request message (960), the target BS generates and updates a connection ID and transmits a ranging response message to the MS (970).

The MS decodes the superframe of the target BS in the above procedure (950 and 970) for transmitting and receiving signals to and from the target BS or in the subsequent procedure. Here, the MS uses subframe grouping information received through the handover response (MOB_BSHO-RSP) message to decode the superframe.

Table 2 illustrates an example handover response (MOB_BSHO-RSP) message including subframe grouping information.

TABLE 2

| Syntax | Size | Notes |
|---|---|---|
| MOB_BSHO-RSP_Message format( ) { | — | — |
| Management Message Type = 58 | 8 bits | — |
| Mode | 4 bits | 0b000: HO request<br>0b001: MDHO/FBSS request: Anchor BS update with CID update<br>0b010: MDHO/FBSS request: Anchor BS update without CID update<br>0b011: MDHO/FBSS request: Diversity Set update with CID update<br>0b100: MDHO/FBSS request: Diversity Set update without CID update<br>0b101: MDHO/FBSS request: Diversity Set update with CID update for newly added BS<br>0b110: MDHO/FBSS request: Diversity Set update with CID update and CQICH allocation for newly added BS<br>0b111: MS handover request not recommended (BS in list unavailable) |
| Reserved | 5 bits | Shall be set to zero. |
| If (Mode == 0b000) { | — | — |
| HO operation mode | 1 bit | 0: Recommended HO response.<br>1: Mandatory HO response. |
| N_Recommended | 8 bits | — |
| Resource Retain Flag | 1 bit | 0: Release connection information.<br>1: Retain connection information. |
| Reserved | 6 bits | Shall be set to zero. |
| For (j=0 ; j<N_Recommended ; j++) { | — | Neighbor base stations shall be presented in an order such that the first presented is the one most recommended and the last presented is the least recommended. |
| Neighbor BSID | 48 bits | — |
| Preamble index/ Preamble Present and Sub-channel Index | 8 bits | For the SCa and OFDMA PHY this parameter defines the PHY specific preamble for the neighbor BS. For the OFDM PHY the 5 LSB contain the active DL subchannel index for the neighbor BS. The 3 |

TABLE 2-continued

| Syntax | Size | Notes |
| --- | --- | --- |
|  |  | MSB shall be Reserved and set to '0b000' |
| Service level prediction | 8 bits | — |
| Frame group indication | 4 bits |  |
| Frame format indication | 1 bit |  |
| if (Frame group indication = 1111 & Frame format indication = 1){ |  | Same frame format |
|   Start of Sub-frame bitmap | 8 bits |  |
|   Sub-frame bitmap | 8 bits |  |
| } |  |  |
| Else if(Frame format indication = 0){ |  | Different frame format |
|   Number of (bit=1) in Frame group indication | 2 bits |  |
|   for(j=0; j<number of Frame group indication; j++){ |  |  |
|     Start of Sub-frame bitmap | 8 bits |  |
|     Sub-frame bitmap | 8 bits |  |
|   } |  |  |
| } |  |  |
| HO process optimization | 8 bits |  |
| Network Assisted HO supported | 1 bit | Indicates that the BS supports Network Assisted HO. |
| HO_ID_included_indicator | 1 bit | Indicates if the field HO_IND is included. |
| If (HO_ID_included_indicator == 1) { | — | — |
|   HO_ID | 8 bits | ID assigned for use in initial ranging to the target BS once this BS is selected as the target BS. |
| } | — | — |
| HO_authorization policy indicator | 1 bit | To indicate if authorization negotiation is used in HO procedure. 0: EAP authorization and the value of the MAC mode field in the current BS (default) 1: The authorization policy for the target BS is negotiated. |
| Reserved | 4 bits | Shall be set to zero. |
| If (HO_authorization policy indicator == 1) { | — | — |
|   HO_authorization_policy_support | 8 bits | Bit #0: RSA authorization Bit #1: EAP authorization Bit #2: Authenticated-EAP authorization Bit #3: HMAC supported Bit #4: CMAC supported Bit #5: 64-bit Short-HMAC Bit #6: 80-bit Short-HMAC Bit #7: 96-bit Short-HMAC |
| } | — | — |
| } | — | — |
| } | — | — |
| else if (Mode == 0b001) { | — | — |
| Temp BSID | 3 bits | TEMP_BSID of the recommended Anchor BS. |
| AK Change Indicator | 1 bit | To indicate whether the AK being used should change when switching to a new Anchor BS. If set to 0, the MS should continue to use the AK currently in use. If set to 1, the MS should use the AK derived for use with the new Anchor BS. |
| N_CIDs | 8 bits | Number of CIDs that need to be reassigned. For MDHO, N_CIDs shall be set to zero. |

TABLE 2-continued

| Syntax | Size | Notes |
| --- | --- | --- |
| For (i= 0;i<N_CIDs;i++) { | — | — |
| New CID | 16 bits | New CID to be used after Diversity Set is updated. |
| } | — | — |
| N_SAIDs | 8 bits | Number of SAIDs that need to be reassigned. |
| For(i=0; i<N_SAIDs; i++) { | | |
| New SAID | 16 bits | New SAID to be used after Anchor BS is updated. |
| } | — | — |
| } | — | — |
| else if (Mode == 0b010) { | | |
| Temp BSID | 3 bits | TEMP_BSID of the recommended Anchor BS. |
| AK Change Indicator | 1 bit | To indicate whether the AK being used should change when switching to a new Anchor BS. If set to 0, the MS should continue to use the AK currently in use. If set to 1, the MS should use the AK derived for use with the new Anchor BS. |

In Table 2, when the frame group indications are all '1' and the frame format indication is '1', the same subframe grouping format is applied to frames included in the superframe.

On the other hand, when the frame format indication is not '1', the handover response (MOB_BSHO-RSP) message includes different subframe grouping information for each frame.

The embodiments of the present invention provide a downlink signaling method for supporting variable TTIs of a base station when handover is performed, thereby minimizing service delay of each mobile station and enabling efficient utilization of resources.

INDUSTRIAL APPLICABILITY

The present invention provides a downlink signaling method for supporting variable TTIs of a base station when handover of a mobile station is performed in a mobile communication system and a method for decoding frames at a mobile station and can be applied to devices such as a base station and a mobile station in an IEEE 802.16m system or in other IEEE 802.16m compatible systems.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing handover of a mobile station to a target base station by a serving base station in a wireless communication system supporting variable TTI, the method comprising:

updating, by the serving base station, a grouping information field of a Media Access Control (MAC) message using subframe grouping information of the target base station; and periodically broadcasting, by the serving base station, the MAC message including the updated grouping information field to at least one mobile station including the mobile station, wherein the grouping information field includes frame group indication information indicating whether or not respective frames in a superframe have variable TTI at the target base station.

2. The method according to claim 1, wherein the MAC message is a neighbor advertisement (MOB_NBR-ADV) message including information of a neighbor base station.

3. The method according to claim 1, wherein the subframe grouping information comprises first information indicating whether or not respective frames included in the superframe have variable TTI at the target base station and second information indicating a grouping format of each frame having variable TTI at the target base station.

4. The method according to claim 1, wherein the grouping information field further includes at least subframe bitmap start information or a subframe bitmap.

5. The method according to claim 1, wherein the grouping information field further includes at least a frame format indication indicating whether or not subframe grouping formats of the frames included in the superframe are identical or a number of frames having variable TTI in the superframe.

6. The method according to claim 1, wherein the target base station is a base station that has a signal quality level higher than a threshold or has a highest signal quality level among base stations adjacent to the serving base station.

7. A method for performing handover of a mobile station to a target base station by a serving base station in a wireless communication system supporting variable TTI, the method comprising:

updating, by the serving base station, a grouping information field of a handover response message using subframe grouping information of the target base station; and transmitting, by the serving base station, the handover response message including the updated grouping information field to the mobile station when it has been decided to perform handover of the mobile station, wherein the grouping information field includes frame group indication information indicating whether or not respective frames in a superframe have variable TTI at the target base station.

8. The method according to claim 7, wherein the updating the grouping information field includes adding the subframe grouping information to the grouping information field after receiving a handover request from the mobile station.

9. The method according to claim 7, wherein the updating the grouping information field includes:
   deciding whether or not to perform handover of the mobile station according to measurement results from the mobile station included in a measurement report message after receiving the measurement report message from the mobile station; and
   adding the subframe grouping information to the grouping information field when it has been decided to perform handover of the mobile station.

10. The method according to claim 7, wherein the subframe grouping information comprises first information indicating whether or not respective frames included in the superframe have variable TTI at the target base station and second information indicating a grouping format of each frame having variable TTI at the target base station.

11. The method according to claim 7, wherein the grouping information field further includes at least subframe bitmap start information or a subframe bitmap.

12. The method according to claim 7, wherein the grouping information field further includes at least a frame format indication indicating whether or not subframe grouping formats of the frames included in the superframe are identical, or a number of frames having variable TTI in the superframe.

13. The method according to claim 7, wherein the target base station is a base station that has a signal quality level higher than a threshold or has a highest signal quality level among base stations adjacent to the serving base station.

14. A method for a mobile station to perform handover from a serving base station to a target base station in a wireless communication system supporting variable TTI, the method comprising:
   receiving a Media Access Control (MAC) message that is periodically broadcast from the serving base station, the MAC message including a grouping information field indicating subframe grouping information of the target base station; and
   decoding a superframe from the target base station according to the subframe grouping information while performing handover to the target base station,
   wherein the grouping information field includes frame group indication information indicating whether or not respective frames in the superframe have variable TTI at the target base station.

15. A method for a mobile station to perform handover from a serving base station to a target base station in a wireless communication system supporting variable TTI, the method comprising:
   transmitting a handover request message to the serving base station;
   receiving a handover response message from the serving base station, the handover response message including a grouping information field indicating subframe grouping information of the target base station; and
   decoding a superframe from the target base station according to the subframe grouping information while performing handover to the target base station,
   wherein the grouping information field includes frame group indication information indicating whether or not respective frames in the superframe have variable TTI at the target base station.

* * * * *